United States Patent [19]

Peterson

[11] 4,419,886
[45] Dec. 13, 1983

[54] RATE OF PENETRATION SENSOR FOR OIL DRILLING RIGS

[75] Inventor: Leslie D. Peterson, Santa Ana, Calif.

[73] Assignee: Cooper Industries, Inc., Houston, Tex.

[21] Appl. No.: 332,243

[22] Filed: Dec. 18, 1981

[51] Int. Cl.³ ............................................. E21B 45/00
[52] U.S. Cl. ............................. 73/151.5; 33/141 R; 33/141 C; 175/45
[58] Field of Search .................... 73/151.5; 33/141 C, 33/141 R; 175/45

[56] References Cited

U.S. PATENT DOCUMENTS

| | | | |
|---|---|---|---|
| 3,335,754 | 8/1967 | Lankford, Jr. et al. | 73/151.5 |
| 3,853,004 | 12/1974 | Westlake et al. | 73/151.5 |
| 4,099,410 | 7/1978 | Martin | 73/151.5 |

FOREIGN PATENT DOCUMENTS

| | | | |
|---|---|---|---|
| 687228 | 3/1977 | U.S.S.R. | 73/151.5 |
| 815266 | 1/1978 | U.S.S.R. | 73/151.5 |

Primary Examiner—Howard A. Birmiel
Attorney, Agent, or Firm—Spensley, Horn, Jubas & Lubitz

[57] ABSTRACT

Apparatus for indicating the change in position of a travelling block coupled to a wire line which is wrapped around a drum, comprising a motion pickup device responsive to the drum for providing a first shaft output having a fixed relationship to the rotation of the drum, an infinitely adjustable drive unit responsive to the first shaft output for providing a second shaft output having an adjustable relationship to the rotation of the drum, a pneumatic logic circuit responsive to the second shaft output for providing pulses that approximately coincide with each foot and each five-foot multiple of travelling block movement, and an output unit for displaying the foot and five-foot pulses. Calibration of the apparatus is accomplished by adjusting the drive unit to provide an average of the correct rate of travelling block movement relative to rotary motion of the drum.

22 Claims, 2 Drawing Figures

RATE OF PENETRATION SENSOR FOR OIL DRILLING RIGS

BACKGROUND OF THE INVENTION

1. Field of the Invention

The present invention relates to a rate of penetration sensor for oil drilling rigs and, more particularly, to a method and apparatus for obtaining travelling block position change data on a drilling rig without the use of a measuring line.

2. Description of the Prior Art

In an oil well drilling rig, a travelling block is suspended from a crown block and a drilling apparatus coupled to the travelling block extends into a drilling hole. As drilling proceeds, the drilling apparatus penetrates the earth's surface at a rate which is determined by a number of variables. It is desired to monitor and record the rate of penetration of the drilling apparatus, as well as other events.

The most common method of obtaining the desired rate of penetration information in a drilling rig is to utilize a measuring line directly connected to the travelling block. These devices have problems with respect to reliability because the lines often break. There is also difficulty in making necessary repairs.

As an alternative to direct measurement by means of a wire line, travelling block position may be obtained by determining the amount of cable paid out or wound onto a rotating drum from an arbitrary reference point. This amount of cable is mathematically related to the position of the travelling block in the oil derrick above the rig floor. This relation is a function of the number of feet of cable paid out (or wound in) and the number of lines strung between the crown block and travelling block. A system employing measurment of drum rotation to determine travelling block position is shown in U.S. Pat. Nos. 4,114,435 and 4,156,467 to Patton et al.

Because different layers of cable wound around the drum have different diameters, the amount of cable paid out during each revolution of the drum will not be constant. In order to increase the accuracy of the block position determination, some compensation must be made for varying diameters of wraps about the drum. Patton et al use a computer to accomplish this function. Other measurement devices which utilize electronics to compensate for varying diameters of material wound about a drum are shown in U.S. Pat. No. 3,710,084 to Slagley et al and U.S. Pat. No. 4,024,645 to Giles. Although such systems may provide accurate measurements, the use of an electronic measurement system is not desirable in an oil rig environment because there is frequently no readily available and reliable source of electricity. Even when electricity is available, it may be dangerous to use electrically activated devices due to the possibility of an explosion.

The use of pneumatic devices to measure movement of the travelling block is shown in U.S. Pat. No. 3,750,480 to Dower and U.S. Pat. No. 3,214,762 to Van Winkel. The use of pneumatic devices avoids the problems associated with electronic measurement systems. However, the Dower and Van Winkel systems do not incorporate any type of compensation scheme to assure that accurate measurements are provided despite the varying diameters of cable wraps around the drum. Furthermore, all known systems are relatively complex and cumbersome.

SUMMARY OF THE INVENTION

The present invention offers a far simpler and more practical solution for dealing with compensation for the varying diameters of wraps about the drum. The present invention uses simple mechanical and pneumatic devices in order to avoid problems with electrical signals on drilling rigs. The present system consists of a motion pickup device, a pulse generator and an actuator for recording the transmitted data. Motion from the drawworks drum is applied via a clutch/drive mechanism to an adjustable drive unit which has a cam and limit valve arrangement at its output. Pneumatic signals from the limit valves are processed by a simple logic circuit to provide pulses that coincide with each foot and each five-foot multiple of downward travelling block motion while drilling. The pulses are transmitted through tubing to the recorder where actuators move a pen arm to record one foot and five-foot events. Calibration of the system is accomplished by adjusting the drive unit to provide an average of the correct rate of travelling block movement relative to rotary motion of the drawworks drum.

Briefly, the present apparatus for indicating the change in position of a travelling block coupled to a wire line which is wrapped around a drum comprises a motion pickup device responsive to the drum for providing a first shaft output having a fixed relationship to the rotation of the drum, an infinitely adjustable drive unit responsive to the first shaft output for providing a second shaft output having an adjustable relationship to the rotation of the drum, a pneumatic logic circuit responsive to the second shaft output for providing pulses that approximately coincide with each foot and each five-foot multiple of travelling block movement, and an output unit for displaying the foot and five-foot pulses. Calibration of the apparatus is accomplished by adjusting the drive unit to provide an average of the correct rate of travelling block movement relative to rotary motion of the drum.

OBJECTS, FEATURES AND ADVANTAGES

It is the object of the present invention to solve the problems associated with determining rate of penetration of a drilling apparatus in a drilling rig. It is a feature of the present invention to solve these problems by the provision of a simple mechanical and pneumatic device for indicating the change in position of a travelling block coupled to a wire line wrapped around a drawworks drum which compensates for varying diameters of wraps about the drum. An advantage to be derived is the ability to obtain desired position change information without a measuring line. A further advantage is the elimination of complex electronic systems. A still further advantage is the elimination of electrical signals from an oil drilling rig. Another advantage is the use of the pneumatic/mechanical system which includes diameter of wrap compensation.

Still other objects, features, and attendant advantages of the present invention will become apparent to those skilled in the art from reading of the following description of the preferred embodiment constructed in accordance therewith, taken in conjunction with the accompanying drawings wherein like numerals designate like or corresponding parts in the several figures and wherein:

DESCRIPTION OF THE PREFERRED EMBODIMENT

Figure 1:
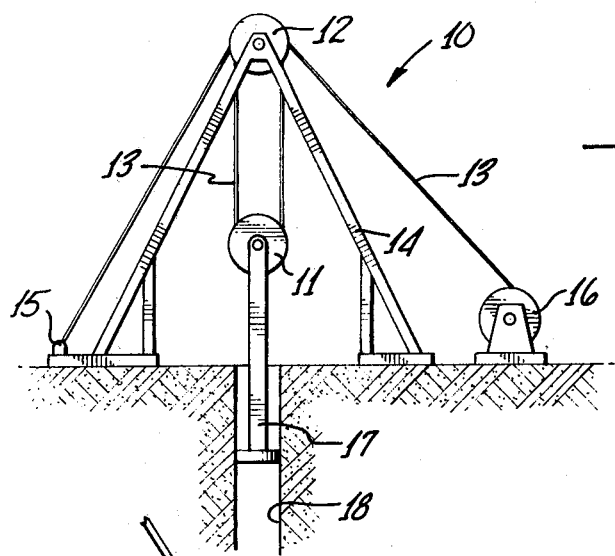
FIG. 1 is a schematic diagram of an oil drilling rig.

Referring now to the drawings and, more particularly, to FIG. 1 thereof, there is shown an oil drilling rig, generally designated 10, including a travelling block 11 suspended from a crown block 12 by means of a cable 13. Crown block 12 is supported above the surface of the ground by means of a suitable derrick 14. One end of cable 13 is secured at a suitable location 15 on derrick 14 and the other end of cable 13 is wrapped around a rotatable drawworks drum 16. Drum 16 has a plurality of wraps (one rotation of cable 13 around drum 16) and a plurality of layers (a complete set of wraps that fill the drum from flange to flange in a level, even layer). A drilling apparatus 17 is coupled to traveling block 11 and extends into a drill hole 18.

Figure 2:
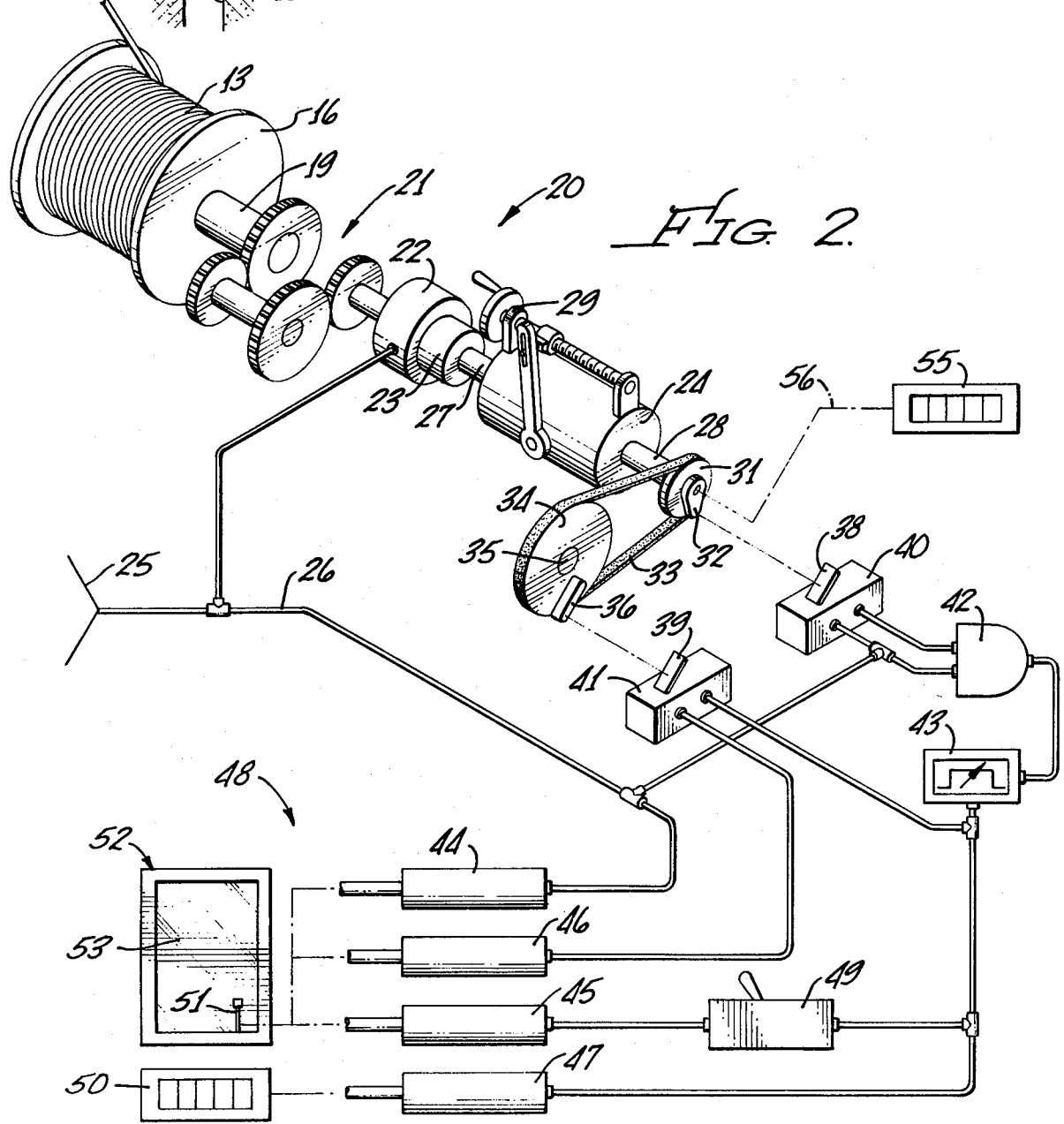
FIG. 2 is a schematic perspective diagram of the rate of penetration sensor and output unit of the present invention.

Referring now to FIG. 2, the present rate of penetration sensor, generally designated 20, utilizes the shaft 19 of drawworks drum 16 as the primary pickup point. In cases where it may be difficult to use this area, a follower wheel on the flange of drum 16 may be used. On certain drawworks, a follower wheel on the drum clutch may be used. Other pickup points are possible. For proper operation of sensor 20, it is only necessary to use a point where the motion is always in a fixed rotational relationship to drum 16.

Shaft 19 of drum 16 is connected via a suitable gearing arrangement 21 and a pair of clutches 22 and 23 to the input of an adjustable drive unit 24. Sensor 20 is preferably an entirely pneumatic and mechanical system driven from a source of compressed air 25. Clutch 22 is, therefore, an air clutch receiving air pressure from source 25 over a line 26. Clutch 22 is used to disengage sensor 20 during operations other than drilling. After placing the drill bit on the bottom to resume drilling, the driller turns the system back on by engaging clutch 22. Also, to preclude generating erroneous pulses caused by reverse motion, clutch 23 is a one-way clutch which permits a shaft input to variable drive unit 24 only during rotation of drum 16 in a single direction. One-way clutch 23 is desirable because a driller often starts bringing pipe back out of drill hole 18 before turning system 20 off.

Drive unit 24 is an infinitely adjustable input-to-output-ratio drive device used for ratio calibration. According to the preferred embodiment of the invention, unit 24 is a Zero-Max adjustable drive unit having an input shaft 27 and an output shaft 28, the rotational ratio of which is adjusted manually by means of an adjustment control 29. Shaft 27 is connected to clutch 23 and shaft 28 is connected to a pulley 31 and a cam 32. Pulley 31 drives, via a belt 33, a second pulley 34 mounted on a shaft 35 which also has mounted thereon a cam 36. Cams 32 and 36 are positioned to engage the arms 38 and 39, respectively, of limit valves 40 and 41, respectively. Obviously, the positions of pulleys 31 and 34 could be reversed with shaft 28 driving pulley 34 and pulley 34 driving pulley 31 via belt 33.

Other adjustable drives might work equally as well, as would various means of pulse generation. Pulses could be generated by using interruptable jets or reflex sensors (back pressure devices) with a perforated or slotted disk. Since, however, these devices generally require the use of amplifiers to achieve working pressure levels, the present limit valve approach seems simpler.

The output of limit valve 40 is connected to one input of an AND gate 42. The air pressure on line 26 is connected both to valve 40 and to the other input of gate 42. The output of gate 42 is connected to a pulse unit 43. The output of pulse unit 43 is applied to valve 41.

Four actuating cylinders 44–47 in an output unit 48 are used to process the information from sensor 20. Cylinder 44 is an on-off cylinder which moves a pen arm 51 of a strip chart recorder 52 a short distance on a chart 53 to show that sensor 20 is in operation. Cylinder 44 receives the pressure on line 26 from source 25. This position becomes the baseline from which the one foot and five-foot marks, to be described more fully hereinafter, extend. Cylinder 45 is a one-foot cylinder which moves pen arm 51 of a strip chart recorder 52 a short distance above the system "on" baseline and cylinder 46 is a five-foot cylinder which moves pen arm 51 a longer distance above the baseline. Cylinder 45 receives air pressure from pulse unit 43 via a lockout valve 49. Cylinder 46 receives air pressure from valve 41. Cylinder 47 is a footage counter cylinder which receives its signal from pulse unit 43 and operates a mechanical counter 50 to record total footage accumulated.

Valves 40 and 41 are conventional, normally closed, air valves which open to permit the passage of air therethrough upon the actuation of arms 38 and 39, respectively. Because the amount of time that valve 40 may be open is variable, a conventional pneumatic pulse unit 43, similar to a monostable multivibrator, is used so that air passes therethrough for only a predetermined period of time. Upon the initiation of its timing function, air will be passed through pulse unit 43 for a predetermined period of time and conducted to valve 41, cylinder 47 and cylinder 45 via lockout valve 49. Thus, the purpose of pulse unit 43 is to allow the pen mechanism to return to its baseline after recording a one foot or a five foot mark.

AND gate 42 is necessary for the proper operation of pulse unit 43. That is, during slow operations especially, valve 40 will open very slowly and, for some period of time, will gradually bleed air. If this air were to be bled directly into pulse unit 43, its timing function would start prematurely and it would shut off before the line to output unit 48 reached full operating pressure. To prevent this from occurring, one side of AND gate 42 is preconditioned with supply pressure air from supply 25. Air pressure from valve 40 builds up on the other side of AND gate 42, and, at some percentage of the supply pressure, such as 65%, gate 42 opens and feeds the fully supply pressure to pulse unit 43. Thus, pulse unit 43 sends a full pressure pulse of air to the remaining components for the operation thereof.

In operation, when the driller turns the air valve for source 25 on, supply pressure is routed via line 26 to air clutch 22, to one side of AND gate 42 and to on/off cylinder 44 of output unit 48. Pressure at clutch 22 engages sensor 20 for operation, pressure to AND gate 42 preconditions it for operation with one foot limit valve 40, and pressure to on/off cylinder 44 moves pen arm 51 of recorder 52 to the "on" position on strip chart 53.

During drilling, the rotation of shaft 28 of drive unit 24 drives cams 32 and 36 to operate valves 40 and 41, respectively, which are both normally closed. The driving of shaft 35 from shaft 28 is such that cam 32 rotates exactly five times for every rotation of cam 36. In any event, the output from one foot valve 40 is conducted to AND gate 42 which opens and sends pressure to pulse unit 43. Pulse unit 43 is normally passing, so pressure is immediately transmitted to cylinder 45 via valve 49 and also to footage counter cylinder 47. After a predetermined time delay, pulse unit 43 shuts off and cylinders 45 and 47 return to normal.

Valve 41 is synchronized to open every fifth cycle of valve 40. Valve 41 is mechanically timed to open before and remain open during the time valve 40 is open on that cycle. Accordingly, when the one foot signal is generated by pulse unit 43, the air pulse also travels through valve 41 to actuate cylinder 46. Since cylinder 46 moves pen arm 51 of recorder 52 farther than cylinder 45, the action of cylinder 45 at this time has no effect. Pressure in the one foot side of the circuit, however, still operates footage counter 50 via cylinder 47. For fast drilling conditions which would render meaningless the one foot marks, lockout valve 49 blocks the one foot signals so that only five foot marks are recorded on strip chart 53.

There is a direct relationship between feet of line paid out (or in) from drum 16 and feet of vertical motion of travelling block 11. This is a direct ratio equal to the number of lines in the travelling block system. For example, assuming ten vertifcal lines between travelling block 11 and crown block 12, ten feet of line motion from drum 16 will equal one foot of motion of travelling block 11.

Likewise, there is a direct relationship between the rotation of drum 16 and feet of line paid out (or in). One revolution of drum 16 equals $\pi D$ feet of line where D is the effective means diameter of the line wraps. For a given layer of wraps, this relationship is constant. For the next layer of wraps (up or down), the difference in the line length is $\pi$ times the change in effective main diameter. Change in mean diameter is a function of line size and is approximately equal to $d\sqrt{3}$ where $d =$ line diameter. Calibration is simply a matter of adjusting drive unit 24 so that pulse unit 43 generates pulses at the correct average rate.

It is recognized that the output of pulse unit 43 will in fact be an average rate, which recognizes the existence of an error. Considering a typical drilling rig, and based on a precisely known drilling rate, very close analysis will reveal a slight deviation between the time at which pulse unit 43 indicates one foot of movement and an actual movement of one foot. As a practical matter, however, these deviations are nonexistent. Furthermore, even though small deviations do exist during drilling, in averaging, the self-correcting nature of the present system will provide accurate footage information at the end of each joint of pipe. It should also be noted that in a significant portion of circumstances, a shift from one layer to the next does not occur while drilling. In those cases averaging does not exist and there will be no averaging deviation at all.

Calibration of sensor 20 is accomplished by first establishing the actual distance travelling block 11 will move while drilling. A calibration counter 55 is mechanically coupled via a line 56 to shaft 28. With calibration counter 55 starting at zero and the system turned on, travelling block 11 is lowered a known distance and the reading on counter 55 is compared to the actual distance. If the reading in counter 55 is incorrect, adjustment control 29 on drive unit 24 is used to correct the drive ratio between shafts 27 and 28.

As an example, the driller might use a joint of pipe for calibration. He would first measure the pipe, zero calibration counter 55, and, using a convenient reference point, lower the pipe a distance equal to the length of the pipe. If the reading on counter 55 is low compared to the actual distance, drive unit 24 would be adjusted in the "higher" direction (or vice versa). Then by subsequent trials and adjustments, an accurate reading of distance on calibration counter 55 would be reached. Since counter 55 typically reads to tenths of a foot, calibration to one-tenth should be possible. It is estimated that sensor 20 could be calibrated in four or five trails and in probably less than ten minutes time.

Recalibrating each time line 13 is slipped or cut would be accomplished much the same way. Assuming a wrap shift does exist under a particular set of conditions, slipping line 13 will place more line on the higher layer. On the average, each revolution of drum 16 will pay out more line than previously. Therefore, drive unit 24 will have to be adjusted slightly higher for counter 55 to be read correctly. Conversely, when cutting line, more wraps will again be active on the bottom layer and drum 16 will turn more revolutions for a given amount of travel of block 11. Therefore, the adjustment will be lower. Rerigging for more "lines up" will have the same effect as the last condition above. More lines means more revolutions per foot of travel of block 11. Therefore, drive unit 24 will be adjusted downwardly.

As previously mentioned, the actual type of drive unit 24 is not important. All that is required is infinite adjustability for calibration. A study of drawworks sizes, line sizes and combinations of "lines up" conditions indicate that the extremes of drum motion are approximately 19.8 minimum and 58.9 maximum revolutions per 30 feet of travelling block motion. As it relates to pulse generator 43, this means 0.66 revolutions per one foot pulse minimum, 1.96 revolutions per one foot pulse maximum. All that is necessary is to provide ratio adjustability to cover these extremes which represent an adjustment range of approximately 2.97:1. The characteristics of different types of drive units will vary as to the actual reduction ratios. Whatever the characteristics, however, the system may be geared up or down to achieve the desired range of input revolutions per output pulse.

It will also be evident to those skilled in the art that the present system need not be implemented mechanically/pneumatically. The present system can be implemented entirely mechanically or can be implemented electrically. However, for use in a drilling rig environment, the present embodiment is preferred.

It can therefore be seen that the present invention offers a far simpler and more practical solution for dealing with compensation for the varying diameters of wraps about drum 16. The present invention uses simple mechanical and pneumatic devices in order to avoid problems with electrical signals on drilling rigs. The present invention consists of a motion pickup device, a pulse generator, and an actuator for recording the transmitted data. Motion from drawworks drum 16 is applied via a clutch/drive mechanism 22/23 to an adjustable drive unit 24 which has a cam 32/36 and a limit valve 40/41 arrangement at its output. Pneumatic signals from limit valves 40 and 41 are processed by simple logic circuitry to provide pulses that coincide with each foot and each five foot multiple of downward travelling block motion while drilling. The pulses are transmitted through tubing to output unit 48 where cylinders 44-46 move pen arm 51 to record one foot and five foot events. Calibration of the system is accomplished by adjusting drive unit 24 to provide an average of the correct rate of travelling block movement relative to rotary motion of drawworks drum 16.

While the invention has been described with respect to the preferred physical emobidment constructed in accordance therwith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

I claim:

1. Apparatus for determining the amount of wire paid out from a drum comprising:
    means for providing a first output having a fixed relationship to the rotation of said drum;
    adjustable input-to-output-ratio drive means responsive to said first output for providing a second output having an adjustable relationship to the rotation of said drum, said drive means being adjustable to provide an average of the correct rate of wire paid out from said drum relative to rotary motion of said drum; and
    means responsive to said second output for generating a third output approximately indicative of a given amount of wire paid out from said drum.

2. Apparatus according to claim 1, wherein said first output providing means comprises:
    means operatively connected to said drum for providing a first shaft output having a fixed rotational relationship to said drum.

3. Apparatus according to claim 2, wherein said drive means comprises:
    an infinitely adjustable input-to-output-ratio drive device coupled to said first shaft output for providing a second shaft output.

4. Apparatus according to claim 1, 2 or 3, wherein said third output generating means comprises:
    means responsive to said second output for generating a pulse for each given amount of wire paid out from said drum.

5. Apparatus according to claim 4, further comprising:
    means for displaying or recording said third output.

6. Apparatus according to claim 4, wherein said third output generating means further comprises:
    means responsive to said second output for generating second pulses at a rate which is a given multiple of the rate of generating of said first mentioned pulses.

7. Apparatus according to claim 6, wherein said given multiple is a multiple of five.

8. Apparatus according to claim 6, further comprising:
    means for displaying or recording said first and second pulses.

9. A method for determining the amount of wire paid out from a drum comprising:
    providing a first output having a fixed relationship to the rotation of said drum;
    providing a second output responsive to the first output and having an adjustable relationship to the rotation of said drum;
    adjusting said second output to provide an average of the correct rate of wire paid out from said drum relative to rotary motion of said drum;
    generating in response to said second output a third output approximately indicative of a given amount of wire paid out from said drum; and
    displaying or recording said third output.

10. A method according to claim 9, wherein said second output providing step comprises:
    providing an infinitely adjustable input-to-output-ratio drive device responsive to said first output for providing said second output.

11. A method according to claim 10, wherein said third output generating step comprises:
    generating a pulse for each given amount of wire paid out from said drum.

12. In an oil drilling rig, apparatus for indicating the change in positin of a travelling block coupled to a wire line which is wrapped around a drum, comprising:
    means for providing a first output having a fixed relationship to the rotation of said drum;
    adjustable input-to-output ratio drive means responsive to said first output for providing a second output having an adjustable relationship to the rotation of said drum, said drive means being adjustable to provide an average of the correct rate of wire paid out from said drum relative to rotary motion of said drum; and
    means responsive to said second output for generating a third output approximately indicative of a given amount of movement of said travelling block.

13. Apparatus according to claim 12, wherein said first output providing means comprises:
    means operatively connected to said drum for providing a first shaft output having a fixed rotational relationship to said drum.

14. Apparatus according to claim 13, wherein said drive means comprises:
    an infinitely adjustable input-to-output-ratio drive device coupled to said first shaft output for providing a second shaft output.

15. Apparatus according to claim 12, 13 or 14, wherein said third output generating means comprises:
    means responsive to said second output for generating a pulse for each given amount of movement of said travelling block.

16. Apparatus according to claim 15, further comprising:
    means for displaying or recording said third output.

17. Apparatus according to claim 15, wherein said third output generating means further comprises:
    means responsive to said second output for generating second pulses at a rate which is a given multiple of the rate of generation of said first mentioned pulses.

18. Apparatus according to claim 17, wherein said given multiple is a multiple of five.

19. Apparatus according to claim 17, further comprising:
    means for displaying or recording said first and second pulses.

20. In an oil drilling rig, a method for obtaining the change in position of a travelling block coupled to a wire line which is wrapped around a drum, comprising:

providing a first output having a fixed relationship to the rotation of said drum;

providing a second output responsive to the first output and having an adjustable relationship to the rotation of said drum;

adjusting said second output to provide an average of the correct rate of travelling block movement relative to rotary motion of said drum;

generating in response to said second output a third output approximately indicative of a given amount of movement of said travelling block; and displaying or recording said third output.

21. A method according to claim 20, wherein said second output providing step comprises:

providing an infinitely adjustable input-to-output-ratio drive device responsive to said first output for providing said second output.

22. A method according to claim 21, wherein said third output generating step comprises:

generating a pulse for each given amount of movement of said travelling block.

* * * * *